United States Patent
Boettcher

[11] 3,913,271
[45] Oct. 21, 1975

[54] APPARATUS FOR MACHINING WORK PIECES

[75] Inventor: Stephen A. Boettcher, Deerfield, Ill.

[73] Assignee: Speedfam Corporation, Des Plaines, Ill.

[22] Filed: Feb. 4, 1974

[21] Appl. No.: 439,317

[52] U.S. Cl. .................. 51/5 R; 51/134; 51/237 T; 214/1 BC
[51] Int. Cl. .............................................. B24b 7/04
[58] Field of Search .......... 51/5 R, 108, 134, 215 R, 51/215 AR, 215 HM, 237 T; 214/1 BC, 1 BH

[56] References Cited
UNITED STATES PATENTS

| | | | |
|---|---|---|---|
| 1,699,516 | 1/1929 | Anderson | 51/134 |
| 1,832,190 | 11/1931 | Doane | 51/108 R |
| 1,921,715 | 8/1933 | Whitney | 51/108 R |
| 2,272,055 | 2/1942 | Carlson | 51/108 R |
| 2,352,180 | 6/1944 | Bolsey | 51/108 R |
| 2,493,206 | 1/1950 | Okey | 51/134 |
| 3,284,959 | 11/1966 | Seidel | 51/108 R |
| 3,793,779 | 2/1974 | Perrella | 51/134 X |

*Primary Examiner*—Al Lawrence Smith
*Assistant Examiner*—Nicholas P. Godici
*Attorney, Agent, or Firm*—Johnson, Dienner, Emrich & Wagner

[57] ABSTRACT

The apparatus defines at least two work stations, at one of which is disposed an abrading machine having an operating surface, and above which carrier means is movable. Power actuated means on the carrier means selectively serves to raise and lower at least one work piece, to transfer the work piece from one work station to the other, and to forcibly urge the work piece against the operating surface.

9 Claims, 5 Drawing Figures

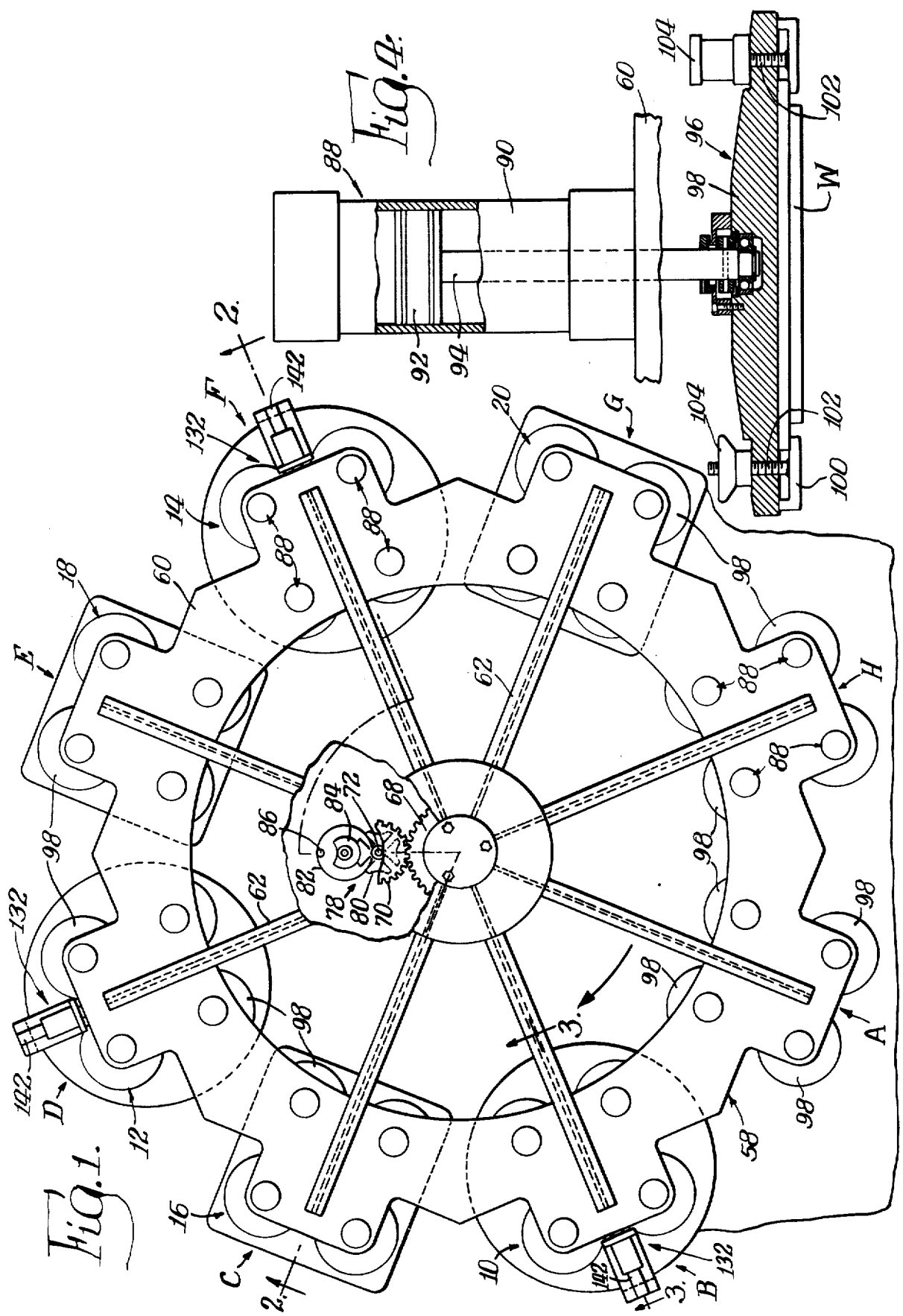

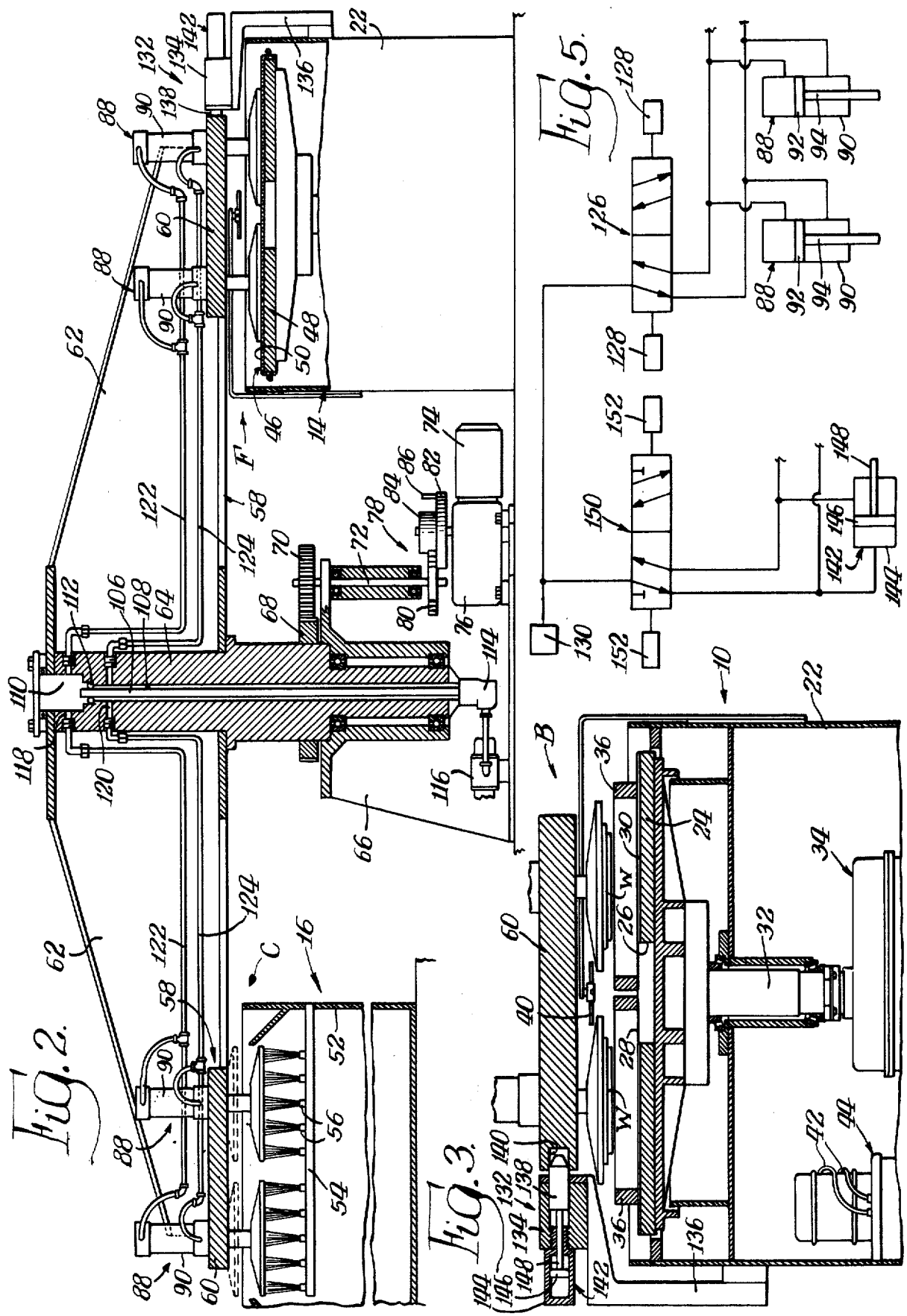

APPARATUS FOR MACHINING WORK PIECES

BACKGROUND OF THE INVENTION

1. Field of the Invention

The present invention relates to apparatus for automatic machining--lapping, polishing, or both--of work pieces.

2. Description of the Prior Art

Abrading machines are frequently used for machining work pieces. A conventional abrading machine comprises a horizontal rotatable abrading wheel assembly, and a plurality of stationary vertically disposed pneumatic assemblies mounted thereabove. In using this type of machine, several individual work pieces (or several groups of work pieces) to be machined are moved separately onto the abrading wheel, the pneumatic assemblies are actuated to forcibly urge the work pieces against the abrading wheel while the latter is rotating, and, after machining, the work pieces are moved off of the abrading wheel.

When work pieces are to be machined in steps--for example, first coarsely lapped and then finely lapped--each operation is frequently carried out in a separate abrading machine, and the work pieces are carried or transferred manually from one machine to the other.

The disadvantages of conventional apparatus and procedures are readily apparent. By way of illustration, loading and unloading time of each machine is relatively high in proportion to machining time and, when two or more machines are used in sequence, transfer of work pieces from one machine to another is laborious and time consuming.

SUMMARY OF THE INVENTION

In the apparatus of the present invention, vertically disposed pneumatic assemblies are mounted on a carrier member movable horizontally above at least two work stations. The pneumatic assemblies are selectively actuatable to raise and lower pressure plates having work pieces secured thereto, to transfer the plates and work pieces from one work station to another work station, and to apply downward pressure on the plate members to forcibly urge the work pieces into operating engagement with an abrading machine disposed at one of the work stations.

More specifically, the apparatus defines a series of work stations--including a loading station, a plurality of machining and cleaning stations, and an unloading station--modularly spaced in a circular pattern. The carrier member is revolvable in arcuate steps with brief dwell periods at each work station, whereby the pneumatic assemblies serve to transfer the pressure plates and work pieces successively from the loading station, through the machining and cleaning stations, to the unloading station. Additionally, indexing means are provided for positively locating the pneumatic assemblies at the machining stations.

With the apparatus of the present invention loading and unloading time of an abrading machine in relation to machining time is minimized, and work pieces are transferred automatically from one machine or work station to another for maximum efficiency.

BRIEF DESCRIPTION OF THE DRAWINGS

FIG. 1 is a plan view of the apparatus of the present invention;

FIG. 2 is a sectional view, on an enlarged scale, taken substantially along the line 2—2 in FIG. 1, looking in the direction indicated by the arrows;

FIG. 3 is a sectional view, on an enlarged scale, taken substantially along the line 3—3 in FIG. 1, looking in the direction indicated by the arrows;

FIG. 4 is an enlarged view, partly in section, of one of the pneumatic piston and cylinder assemblies and associated work piece plate means of the apparatus of FIG. 1; and FIG. 5 is a diagrammatical view of the air system for the pneumatic assemblies incorporated in the apparatus of FIG. 1.

DESCRIPTION OF THE PREFERRED EMBODIMENT

As shown in FIG. 1, the apparatus of the present invention is arranged to define a plurality of horizontally spaced apart work stations A-H located in a circular pattern. In a manner to be presently described in detail, work pieces are loaded at station A, progressively transported from station A through B-G to station H, and unloaded at station H. Disposed at stations B and D are abrading or lapping machines 10 and 12; at station F, an abrading or polishing machine 14; and at stations C, E and G, wash machines 16, 18 and 20.

The lapping machine 10, as shown in FIG. 3, includes a framework with a housing 22 which provides support for a rotatable horizontal circular lapping member or disc 24. By way of illustration, the lapping disc 24 may be of one-piece construction having a central well-bore 26, a horizontal operating or lapping surface 28 engageable by work pieces, and a plurality of radial slots 30 for conveying across the disc abrasive and carrier mixture used in the lapping operation. The lapping disc 24 is secured to the upper end of a vertical shaft 32, and these members are rotatable about a vertical axis by drive means which includes a gear reducer unit 34 and an electric motor (not shown). Resting on the lapping surface 28 are four truing rings 36. During lapping, a freely flowing mixture of relatively coarse abrasive particles and an oil carrier is fed to the lapping disc 24 through discharge tubes 40. The mixture is delivered to the tubes 40 through tubing 42 connected to a sump pump unit 44 located in the lower portion of the housing 22.

The lapping machine 12 is identical in construction and operation to the lapping machine 10, with the exception that the abrasive mixture or slurry fed to the lapping disc is comprised of relatively fine abrasive particles.

The polishing machine 14, as shown in FIG. 2, is similar to the lapping machine 10 with the following principal exceptions: The lapping disc is replaced by a rotatable polishing wheel member or assembly 46 comprised of an annular backing wheel 48 across the upper face of which extends a polishing cloth 50 presenting an operating surface engageable by work pieces; truing rings are absent; and the mixture fed to the polishing wheel assembly 46 comprises a suitable polishing compound suspended or mixed in water.

The wash machine 16, as shown in FIG. 2, includes a housing 52 in which is supported a horizontal generally rectangular hollow casing 54 having a plurality of spray nozzles 56 mounted in the upper face thereof. A fluid pump (not shown) is connected between the lower portion of the housing 52 and the casing 54 for circulating a liquid solvent therebetween. From the casing 54, jet sprays of solvent are directed upwardly through the nozzles 56 to clean work pieces positioned thereabove. The wash machines 18 and 20 are identical in construction and operation to the wash machine 16.

Revolvably moveable horizontally above the work stations A-H, as shown in FIGS. 1 and 2, is carrier means 58 comprised of a circular ring-like carrier member 60 secured at the outer ends of radial web or arm members 62. The inner ends of the arm members 62 are secured to the upper end of a vertical shaft 64 suitably supported and journaled at its lower end in a base frame 66. Secured to the shaft 64 is a gear 68 having meshing engagement with a pinion 70 secured to the upper end of a vertical spindle 72 which is rotatably supported and journaled in the base frame 66. The spindle 72 is rotated by an electric motor 74 and a gear reducer unit 76 operatively connected to the spindle 72 by means of a conventional Geneva drive mechanism 78 comprised of a slotted wheel 80 and a driver 82 having a central boss 84 and a drive pin 86. By reason of the provision of the Geneva drive mechanism 78, the carrier means 58 is revolved or rotated clockwise, as viewed in FIG. 1, about the axis of the shaft 64 in arcuate steps of 45° interrupted by brief dwell periods.

Mounted on the carrier member 60 are eight circumferentially spaced apart groups or sets of four vertically disposed power actuated means in the form of double-acting fluid (preferably pneumatic) piston and cylinder assemblies 88. Each pneumatic assembly 88, as shown in FIG. 4, includes a cylinder 90, a piston head 92, and a piston rod 94 projecting downwardly through the carrier member 60. Rotatably mounted at the lower end of each piston rod 94 for vertical movement therewith is plate means 96 in the form of a horizontal pressure plate 98. A work piece W is adapted to be secured to the underside of the pressure plate 98 by means of a circumferentially continuous ring clamp 100 releasably held in place by a plurality of circumferentially spaced apart threaded members 102 and thumb nuts 104. Each pressure plate 98 is adapted to fit with slight clearance within a truing ring 36.

The pneumatic piston and cylinder assemblies 88 are adapted to be connected to a source of air under pressure in the following manner. As shown in FIG. 2, the shaft 64 has secured therein a central axial tube 106 with an annular clearance 108 surrounding the tube 106. The tube 106 interiorly provides one air passageway which at the upper end communicates with an air chamber 110 formed in the shaft 64, while the clearance 108 serves as another air passageway which is closed at the upper end by a ring seal 112. The lower ends of the tube 106 and the passageway 108 communicate separately through a rotating union 114 with solenoid operated valve means 116 connected with a central source of pressurized air. The shaft 64 is also formed with 16 circumferentially spaced apart radial ports 118 communicating with the air chamber 110, and 16 circumferentially spaced apart radial ports 120 communicating with the passageway 108. Each port 118 is connected through air line means 122 with the upper ends of a pair of pneumatic cylinders 90, and each of the ports 120 is connected through air line means 124 with the lower ends of a pair of pneumatic cylinders 90. The 32 pneumatic assemblies 88 are connected in parallel for simultaneous actuation. As shown diagrammatically in FIG. 5, a shiftable spool valve 126 operated by solenoids 128, and depending on position, either places the lower ends of the pneumatic cylinders 90 in communication with a central source of pressurized air 130 and places the upper ends of the pneumatic cylinders 90 in communication with the atmosphere whereby the piston heads 92 and piston rods 94 are raised, or places the upper ends of the pneumatic cylinders 90 in communication with the central source of pressurized air 130 and places the lower ends of the pneumatic cylinders 90 in communication with the atmosphere whereby the piston heads 92 and piston rods 94 are urged downwardly.

As shown in FIG. 1, indexing means 132 is provided at the three work stations B, D and F. Each indexing means 132, as shown in FIG. 3, comprises a guide casing 134 supported on a bracket member 136 secured to the side of the adjacent machine housing 22. Slidably mounted in the guide casing 134 is a plunger 138 which is adapted to be engaged in any one of eight indexing recesses 140 formed in the edges of the carrier member 60 at equidistantly spaced apart locations. Each indexing plunger 138 is movable axially by means of power actuated means in the form of a double acting fluid (preferably pneumatic) piston and cylinder assembly 142 mounted to the guide casing 134. Each pneumatic assembly 142 comprises a cylinder 144, a piston head 146 and a piston rod 148. The three pneumatic assemblies 142 are connected in parallel for simultaneous actuation. As shown diagrammatically in FIG. 5, a shiftable spool valve 150 operated by solenoids 152, and depending on position, either places the outer ends of the pneumatic cylinders 144 in communication with the central source of pressurized air 130 and places the inner ends of the pneumatic cylinders 144 in communication with the atmosphere whereby the plungers 138 are engaged in the adjacent indexing recesses 140, or places the inner ends of the pneumatic cylinders 144 in communication with the central source of pressurized air 130 and places the outer ends of the pneumatic cylinders 144 in communication with the atmosphere whereby the plungers 138 are withdrawn into the casings 134.

There will now be described the steps involved in finishing work pieces with the above-described apparatus in accordance with the principles of the present invention.

At work station A, work pieces to be finished are manually secured to the four adjacent pressure plates 98. Then, the pressure plates 98 and work pieces secured thereto are raised, and the carrier member 60 is revolved 45° with the pneumatic assemblies 88 serving to transfer the pressure plates 98 and work pieces secured thereto from work station A to work station B.

At work station B, the adjacent pressure plates 98 and work pieces secured thereto are lowered within the four truing rings 36 of the lapping machine 10. At this time, the pneumatic assemblies 88 serve to apply downward pressure on the plates 98 to forcibly urge the work pieces against the lapping surface 28 of the lapping machine 10, while the lapping disc 24 is rotated for coarsely lapping the work pieces. Then, the pressure plates 98 are raised, and the carrier member 60 is revolved 45° with the pneumatic assemblies 88 serving to transfer the pressure plates 98 and work pieces secured thereto from work station B to work station C.

At work station C, the adjacent pressure plates 98 are lowered within the housing 52 to the wash machine 16.

Next, jet sprays of solvent are directed upwardly against the lower surfaces of the work pieces to remove abrasive mixture and other foreign matter. Then, the pressure plates 98 are raised, and the carrier member 60 is revolved 45° with the pneumatic assemblies 88 serving to transfer the pressure plates 98 and work pieces secured thereto from work station C to work station D.

At work station D, the adjacent pressure plates 98 and work pieces secured thereto are lowered within the four truing rings of the lapping machine 12. While the pneumatic assemblies 88 serve to apply downward pressure on the plates 98 to forcibly urge the work pieces against the lapping surface of the lapping machine 12, the lapping disc is rotated for finely lapping the work pieces. Then the pressure plates 98 are raised, and the carrier member 60 is revolved 45° with the pneumatic assemblies 88 serving to transfer the pressure plates 98 and work pieces secured thereto from work station D to work station E.

At work station E, the adjacent pressure plates 98 are lowered within the housing of the wash machine 18. Next, jet sprays of solvent are directed upwardly against the lower surfaces of the work pieces to remove abrasive mixture and other foreign matter. Then, the pressure plates 98 are raised, and the carrier member 60 is revolved 45° with the pneumatic assemblies 88 serving to transfer the pressure plates 98 and work pieces secured thereto from work station E to work station F.

At work station F, the adjacent pressure plates 98 and work pieces secured thereto are lowered, with the pneumatic assemblies 88 serving to apply downward pressure on the plates 98 to forcibly urge the work pieces against the upper surface of the polishing assembly 46 of the polishing machine 14, and the polishing wheel assembly 46 is rotated for polishing the work pieces. Then, the pressure plates 98 are raised, and the carrier member 60 is revolved 45° with the pneumatic assemblies 88 serving to transfer the pressure plates 98 and work pieces secured thereto from work station F to work station G.

At work station G, in sequence, the adjacent pressure plates 98 are lowered within the housing of the wash machine 20, jet sprays of solvent are directed upwardly against the lower surfaces of the work pieces to remove polishing compound and other foreign matter, the pressure plates 98 are raised, and the carrier member 60 is revolved 45° with the pneumatic assemblies 88 serving to transfer the pressure plates 98 and work pieces secured thereto from work station G to work station H.

At work station H, finished work pieces secured to the four adjacent pressure plates 98 are manually removed. Then, the carrier member 60 is revolved 45°, and the pneumatic assemblies 88 and the associated pressure plates 98 are returned to station A for reloading. This completes the description of one complete cycle of operation of the apparatus of the present invention. In one cycle, work pieces are loaded, coarsely lapped, cleaned, finely lapped, cleaned, polished, cleaned, and unloaded.

During each 45° step of rotation of the carrier member 60, the three indexing plungers 138 are maintained disengaged from the adjacent indexing recesses 140. During each dwell period, the indexing plungers 138 are engaged in the adjacent indexing recesses 140 for positively and accurately aligning the pneumatic assemblies 88 at stations B, D and F with the adjacent abrading machines 10, 12 and 14 to attain precision lapping and polishing.

In the normal sequence of operation, work pieces are successively introduced into the finishing cycle at work station A. Therefore, at any given time, except at the initiation or termination of operations, there will be a group of work pieces at each work station in a different stage of the finishing cycle. It will be appreciated that, depending upon finishing and other operational requirements, the number and type of work stations may be increased, decreased, or altered, as desired. Moreover, the work piece securing means associated with each pressure plate 98 may be modified to accommodate single work pieces of different sizes and shapes, or even two or more work pieces each of smaller size than work piece W. To control the solenoids 128 and 152, the abrading and wash machines, and the carrier drive means, for the proper sequence of operation, suitable electrical circuitry is provided.

While there has been shown and described what is believed to be a preferred embodiment of the present invention, it will be understood by those skilled in the art that various rearrangements and modifications may be made therein without departing from the spirit and scope of the invention.

I claim:

1. Apparatus for finishing the surface of work pieces and defining a plurality of horizontally spaced apart work stations arranged in a circular pattern, comprising discrete machines respectively disposed at certain of said work stations, at least two of said machines each including a rotatable member with a horizontal operating surface for engagement by work pieces, carrier means supported independently of said machines and including a circular carrier member revolvable horizontally above said work stations, a plurality of circumferentially spaced apart groups of horizontally disposed plate means with the number of groups corresponding to the number of said work stations and to which work pieces are adapted to be secured on the underside thereof, a plurality of groups of vertically disposed power actuated means carried by said carrier means and respectively connected to said plate means for selectively raising and lowering the latter, each group of said power actuated means selectively serving to transfer the associated group of said plate means and work pieces secured thereto progressively from one of said work stations to another of said work stations upon movement of said carrier means, and the groups of said power actuated means overlying said two machines selectively serving to apply downward pressure on said plate means to forceably urge the work pieces secured thereto against said horizontal operating surfaces of said rotatable members.

2. The apparatus of claim 1 wherein each of said power actuated means comprises a fluid piston and cylinder assembly.

3. The apparatus of claim 2 wherein each of said power actuated means comprises a pneumatic piston and cylinder assembly.

4. The apparatus of claim 3 including a central vertical shaft to which said carrier member is secured, and means for rotating said shaft.

5. The apparatus of claim 4 wherein said means for rotating said shaft comprises a Geneva drive mechanism whereby said shaft and said carrier member are revolved in arcuate steps interrupted by brief dwell periods.

6. The apparatus of claim 5 including indexing means for positively locating the groups of pneumatic assemblies at the work stations where said two machines are disposed.

7. The apparatus of claim 6 wherein said indexing means comprises at least one power actuated plunger selectively engageable with said carrier member.

8. The apparatus of claim 7 wherein said vertical shaft is provided with air passageways connectible at their one ends to a source of pressurized air, and including means connecting the other ends of said air passageways to said pneumatic assemblies.

9. The apparatus of claim 1 wherein at least one other of said machines serves to clean work pieces positioned thereabove.

* * * * *